United States Patent Office 2,877,156
Patented Mar. 10, 1959

2,877,156

ANTI-SPASMODIC PREPARATION CONTAINING ALPHA - p - METHOXYPHENYL - ALPHA-di-n-BUTYLAMINO-ACETAMIDE AND METHOD OF PRODUCING ANTI-SPASMODIC ACTIVITY

Paul A. J. Janssen, Turnhout, Belgium, and David Karel de Jongh, Haarlem, Netherlands, assignors to N. V. Nederlandsche Combinatie voor Chemische Industrie, Amsterdam, Netherlands, a company of the Netherlands No Drawing. Application April 12, 1957
Serial No. 652,379

Claims priority, application Netherlands May 7, 1954

2 Claims. (Cl. 167—65)

This invention relates to preparations for anti-spasmodic administration and method of producing anti-spasmodic activity in human beings, the preparations and practice of this invention having particular effectiveness in the relief of dysmenorrhea.

It is a principal object of this invention to provide anti-spasmodic preparations which have the aforesaid utility and which are low in toxicity.

Compounds and preparations have heretofore been proposed for the purposes aforesaid but have drawbacks because of undesirable toxicity or because of ineffectiveness when administered, or both. Thus known compounds heretofore proposed and made available have exhibited effectiveness in the order of only about 20% of the individuals receiving administration. According to this invention, a much wider effective utility has been realized, the effectiveness being in the order of 70% to 80% of the individuals receiving administration. As regards toxicity, the preparations of this invention exhibit very low toxicity, the toxicity being very considerably less, for example, than papaverine.

According to this invention, the foregoing adjectives and advantages for anti-spasmodic administration are realized by preparations having anti-spasmodic activity which contain the compound alpha-p-methoxyphenyl-di-n-butylamino-acetamide. According to the method of this invention, anti-spasmodic activity in a human being is produced with said compound.

The compound alpha-p-methoxyphenyl-di-n-butylamino-acetamide may be prepared in any suitable manner. However, it has been found that the preferred method of preparing the compound is by the hydrolysis of the corresponding nitrile. It also has been found that the nitrile is preferably obtained by one of the following processes:

(1) By reaction of di-n-butylamine with p-methoxy-benzaldehyde, preferably the bisulfite compound thereof, followed by further reaction with alkali metal cyanide;

(2) By reaction of a salt of di-n-butylamine with p-methoxy-benzaldehyde followed by further reaction with an alkali metal cyanide.

With regard to the hydrolysis of the nitrile to obtain the acetamide compound, the hydrolysis is preferably carried out in the presence of a mineral acid, sulfuric acid normally giving the best results. While the hydrolysis may be carried out at an elevated temperature such as 100°–120° C. and under such conditions may take place in only a few minutes' time, nevertheless it has been found that the hydrolysis will successfully take place even at room temperatures in the presence of an acid such as sulfuric acid, and while the hydrolysis under such conditions takes a considerably longer time such processing is of advantage in that the resulting product as initially precipitated possesses greater purity.

This invention will be further explained by reference to the following examples:

EXAMPLE 1

To 13.6 grams (0.1 mole) of p-methoxy-benzaldehyde at a temperature of 0° C. a saturated aqueous solution of 12.5 grams (0.12 mole) of sodium sulfite was added with constant stirring of the mixture. Then 15.5 grams (0.12 mole) of di-n-butylamine was slowly added in the form of small portions, e. g., dropwise. After about thirty minutes 6.5 grams (0.1 mole) of solid potassium cyanide was added to the reaction mixture. The p-methoxyphenyl-di-n-butyl-acetonitrile then becomes separated after a few minutes' stirring at a temperature of 20° C.

To 10 grams of the aforesaid oily layer 30 ml. of concentrated sulfuric acid was added and the mixture was heated to 100°–120° C. and kept at this temperature during ten minutes. After one hour cooling to 20° C. a threefold volume of water was added at a temperature of 0° C. and the mixture was neutralized with aqueous ammonia (30%). A precipitate was thus immediately obtained which was filtered off and washed with water. Further purification of the compound may be effected by recrystallization from ethyl alcohol or by decoloration using active carbon in an acid medium. For example, the collected precipitate may be dissolved in 100 ml. of 10% hydrochloric acid and heated under reflux for twenty minutes in the presence of 2 grams of added charcoal. After such decoloration the compound may be precipitated with ammonia and again washed with water. Thereafter the precipitate may be recrystallized from ethyl alcohol. The resulting purified product is alpha- p- methoxyphenyl- alpha-di-n- butylamino- acetamide with a melting point of 125°–127° C.

As noted hereinabove, the acetamide compound can be produced in a greater state of purity when the hydrolysis of the corresponding nitrile is carried out at a reduced temperature which desirably is not substantially above room temperature. Optimum results are obtained when the hydrolysis is carried out with concentrated sulfuric acid and by using one part by weight of the nitrile to two parts by volume of 95% sulfuric acid, the hydrolysis continuing for several hours and preferably from two to four days, depending on the particular nitrile undergoing hydrolysis. When the hydrolysis is carried out in this way fewer by-products are formed and a higher yield of the desired final product can be precipitated immediately in the pure state, with the result that further purification steps such as those hereinabove exemplified become superfluous.

Another variation of the foregoing procedure is that one may alternatively use the cheaper substance sodium-metabisulfite ($Na_2S_2O_5$) instead of sodium bisulfite without influence on the yield. The following is an additional example illustrating the foregoing preferred procedures.

EXAMPLE 2

To 680.5 grams (5 moles) of p-methoxy-benzaldehyde at 0° C. a solution of 505 grams (2.65 moles) of sodium-metabisulfite in one litre of water was slowly added with constant stirring at room temperature (20° C.). During the stirring a paste formed which after formation was covered with 650 grams (5.03 moles) of di-butyl amine while maintaining constant stirring at 20° C. The paste liquefied and separated into two layers after about thirty minutes. 250 grams (5.1 moles) of solid potassium cyanide was then added while stirring and after thirty minutes' stirring the mixture was heated to 50° C. and this temperature was kept constant for thirty minutes. Three litres of water were then added, whereupon two layers again were formed. The separated oily layer was washed with water and was mixed with the ether extract of the water layer. The resulting mixture was dried with solid $K_2CO_3$ and the ether was evaporated. The resulting nitrile (1250 grams) was then mixed with 2500 mls. of 95% sulfuric acid at 20°–30° C. The mixture was stirred for forty hours, after which it was poured into ice water. The solution was slowly neutralized with 10 N sodium hydroxide, which was additionally incorporated after neutralization in sufficient amount to provide strong alkalinity. Thereupon the acetamide precipitated and the precipitate was washed with water until the washings were neutral. After filtering and drying at 70° C. pure alpha-p-methoxyphenyl-alpha-dibutylamino-acetamide was obtained having a melting point of 134° C., the yield being 85%–90%.

The melting points hereinabove given are all uncorrected.

The active medicament alpha-p-methoxyphenyl-alpha-di-n-butylamino-acetamide is administered in dosage unit form, as carried by a suitable pharmaceutical carrier, to human beings particularly for the relief of spasms incident to dysmenorrhea. Normally the preparation is orally administered, although it likewise is effective when otherwise administered.

The aforesaid active medicament may be administered in various dosages such as 50, 100, 200, or 400 mg., although the unit dosage range may vary more broadly from about 10 to about 1000 mg., and preferably from about 50 mg. to about 500 mg. The active medicament may be added to or otherwise used with various pharmaceutical carriers. By way of exemplification, various solid carriers may be employed such as lactose, mannitol, cornstarch, talc and magnesium stearate as well as other tableting aids and fillers. If desired, the carrier or diluent may include a time delay material such as glyceryl distearate or glyceryl mono stearate alone or with a wax. The medicinal mixture may then be tableted or encapsulated in a hard gelatine capsule, depending on the commercial unit form desired. Ordinarily tableting is preferred. The amount of carrier or diluent may vary, according to tablet size desired or whether the dosage is made up in encapsulated form, from zero amount to the maximum amount consistent with the practical limits of bulk for a dosage unit. Normally the carrier with which the medicament is mixed does not exceed about 300 to 500 mgs.

The following are typical examples of preparations embodying this invention.

*Example A*

| | Kg. |
|---|---|
| Alpha - p - methoxyphenyl - alpha - d - n - butyl - amino - acetamide powder | 10 |
| Lactose | 22 |

The foregoing are mixed and graulated with a 10% acacia solution and dried. The granulate is forced through a #16 mesh screen, and thereafter is mixed with the following:

| | Kg. |
|---|---|
| Sodium lauryl sulfate | 0.2 |
| Magnesium stearate talc | 1 |
| Amylum solani | q. v. to 37.5 |

This mixture is tableted in the usual way to give 100,000 tablets.

*Example B*

| | Kg. |
|---|---|
| Alpha - p - methoxyphenyl - alpha - d - n - butyl - amino - acetamide | 5 |
| Lactose | 16.5 |

The foregoing are mixed and granulated with a 10% acacia solution and dried. The granulate is forced through a #16 mesh screen, after which it is mixed with the following:

| | Kg. |
|---|---|
| Sodium lauryl sulfate | 0.1 |
| Talc magnesium stearate | 0.6 |
| Amylum solani | q. v. to 25 |

The mixture is tableted in the usual way to give 100,000 tablets.

*Example C*

| | Kg. |
|---|---|
| p-Methoxyphenyl-di-n-butylamino-acetamide | 10.0 |
| Cornstarch | 10.47 |
| Mono-calcium phosphate | 3.8 |
| Di-calcium phosphate | 3.8 |
| Lactose | 10.4 |
| Magnesium stearate | .3 |

The above ingredients are mixed together and slugged. The slugs are passed through a #30 mesh screen and the resulting granulation is tableted to give 100,000 tablets.

The aforesaid effectiveness in the relief of dysmenorrhea of 70% to 80% of patients receiving administration represents the results of clinical studies comprehending over 175 patients and over 400 menstrual periods reported. No toxic or other side effects were observed among the patients treated. For the most part, a tablet containing 100 mg. of the active medicament was orally administered four times daily beginning with the onset of menstruction or shortly prior to onset. Further cilnical studies included administration to twenty-five individuals of 100 mg. of the active medicament four times daily for fourteen consecutive days. Blood counts before and after the therapy revealed no significant decrease in blood cellular elements and there was no evidence of any side reactions.

At normal dosage limits the preparation of this invention is indicated by clinical and pharmacological studies to possess effective selectivity in its action on the uterine muscle, there being little or no effect on the smooth muscles in the gastronomical, circulatory or respiratory system. It likewise exhibits very low side effects of the neuropathic type as evidenced by its low blocking properties against acetylcholine and histamine.

This application is a continuation-in-part of our application Ser. No. 505,508, filed May 2, 1955.

We claim:

1. A pharmaceutical preparation having anti-spasmodic activity in dosage unit form for administration to a human being and comprising a pharmaceutical carrier and as the added active medicament about 10 to about 1000 mgs. of alpha-p-methoxyphenyl-alpha-di-n-butylamino-acetamide.

2. A method of producing anti-spasmodic activity of a living human being which comprises the dosage administration internally of a pharmacetical preparation comprising as the active medicament the compound alpha-p-methoxyphenyl-alpha-di-n-butylamino-acetamide.

References Cited in the file of this patent

Knoevenagel et al.: Berichte der Deutschen Chemischen Gesellschaft, vol. 37, pp. 4087–4094 (1904).

Wilson: "Acetamide Derivatives," J. Am. Pharm. Assn., Sci. Ed., vol. 38, 1949, pp. 466–468.

Burger: "Medicinal Chem.," vol. 1, pp. 403–434, esp. p. 433, Intersci. Publ., New York, 1951.